(12) United States Patent
Kuriyama

(10) Patent No.: US 8,266,364 B2
(45) Date of Patent: Sep. 11, 2012

(54) PORTABLE ELECTRONIC DEVICE AND CONTROL METHOD FOR PROCESSING PASSPORTS

(75) Inventor: Ryouichi Kuriyama, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 571 days.

(21) Appl. No.: 12/173,684

(22) Filed: Jul. 15, 2008

(65) Prior Publication Data

US 2009/0024788 A1    Jan. 22, 2009

(30) Foreign Application Priority Data

Jul. 17, 2007   (JP) ................................. 2007-186125

(51) Int. Cl.
  *G06F 12/14* (2006.01)
(52) U.S. Cl. ........................................ 711/103; 711/115
(58) Field of Classification Search .................... None
  See application file for complete search history.

(56) References Cited

U.S. PATENT DOCUMENTS

| 4,882,474 | A | | 11/1989 | Anderl et al. | |
|---|---|---|---|---|---|
| 6,111,506 | A | * | 8/2000 | Yap et al. .................... | 340/572.1 |
| 2005/0039014 | A1 | * | 2/2005 | Sajkowsky .................... | 713/172 |
| 2006/0117186 | A1 | * | 6/2006 | Yeo ............................... | 713/182 |
| 2007/0008133 | A1 | * | 1/2007 | Kang ........................... | 340/572.1 |
| 2008/0195858 | A1 | * | 8/2008 | Nguyen ....................... | 713/151 |
| 2008/0251586 | A1 | * | 10/2008 | Kawamura et al. .......... | 235/487 |

FOREIGN PATENT DOCUMENTS

| JP | 05-035935 | 2/1993 |
|---|---|---|
| JP | 06-325228 | 11/1994 |
| JP | 2003-006578 | 1/2003 |
| JP | 3502978 B2 | 12/2003 |
| JP | 2005-347873 | 12/2005 |
| WO | WO 2005/116918 A1 | 12/2005 |
| WO | WO 2006/128829 A1 | 12/2006 |

OTHER PUBLICATIONS

Australian Search Report dated Dec. 4, 2008 for Singapore Patent Application 200805035-3.
French Office Action dated Apr. 29, 2011.
Japanese Office Action dated Apr. 3, 2012 for Appln. No. 2007-186125.

* cited by examiner

*Primary Examiner* — Than Nguyen
(74) *Attorney, Agent, or Firm* — Pillsbury Winthrop Shaw Pittman, LLP

(57) ABSTRACT

A portable electronic device is provided with a storage section which stores various pieces of information and a transmitter/receiver section which transmits and receives data to and from external equipment. It is determined whether or not data paired with write data contained in a write command is stored by the storage section when the write command is received by the transmitter/receiver section, the write data is written to the storage section if it is concluded that the data paired with the write data contained in the write command is stored by the storage section, and the transmitter/receiver section is caused to transmit a result of determination on abnormality to the external equipment if it is concluded that the data paired with the write data contained in the write command is not stored by the storage section.

6 Claims, 6 Drawing Sheets

| CLA | INS | P1 | P2 | Lc | Data |
|-----|-----|----|----|----|------|
| 00  | XX  | 00 | 00 | ZZ | Date/time/country code |

| CLA | INS | P1 | P2 | Lc | Data |
|-----|-----|----|----|----|------|
| 00  | YY  | 00 | 00 | ZZ | Date/time/country code |

11a

| Date of expiry | AA············xx |
| --- | --- |
| Issuing country code | BB············xx |
| Passport No. | CC············xx |
| Name | DD············xx |
| Date of birth | EE············xx |
| Sex | FF············xx |

| Record No. | Date | Time | Entry/exit | Country code |
| --- | --- | --- | --- | --- |
| 0001 | 20061101 | 15:00 | Exit | JPN |
| 0002 | 20061101 | 22:00 | Entry | SIN |
| 0003 | 20061105 | 07:00 | Exit | SIN |
| 0004 | 20061105 | 13:00 | Entry | JPN |
|  |  |  |  |  |
|  |  |  |  |  |
|  |  |  |  |  |
| 0020 | 20070312 | 11:00 | Exit | JPN |
| 0021 | 20070312 | 17:00 | Entry | FRA |
|  |  |  |  |  |
|  |  |  |  |  |

FIG. 7

PORTABLE ELECTRONIC DEVICE AND CONTROL METHOD FOR PROCESSING PASSPORTS

CROSS-REFERENCE TO RELATED APPLICATIONS

This application is based upon and claims the benefit of priority from prior Japanese Patent Application No. 2007-186125, filed Jul. 17, 2007, the entire contents of which are incorporated herein by reference.

BACKGROUND OF THE INVENTION

1. Field of the Invention

The present invention relates to a portable electronic device, which is provided with, for example, a communication interface and performs processing in response to a command transmitted from external equipment, and a data control method.

2. Description of the Related Art

In general, an IC card as a portable electronic device is configured so that an IC chip is embedded in a card-shaped housing of a plastic material or the like. The IC card of this type includes a nonvolatile memory, such as an electrically erasable programmable read-only memory (EEPROM) or a flash ROM, which can maintain data without requiring power supply. This IC card records various data to the nonvolatile memory. In recent years, a technique has been developed to reduce the size of nonvolatile memories, so that the IC card can be provided with a large-capacity nonvolatile memory. Thus, the IC card can handle a large amount of data, so that it is widely noticed as a next-generation card.

Further, there is an IC card in which an antenna is embedded in its main body and which can transmit and receive data to and from a card reader/writer through wireless communication. This IC card can read and write data by wireless communication.

Furthermore, there is a portable electronic device such as an IC book in which an IC sheet that includes an IC chip and an antenna or a contact terminal is bound to enable wireless or contact communication with a card reader/writer.

Proposed in Jpn. Pat. Appln. KOKAI Publication No. 2003-006578 is an admission and departure control system that performs access control or entry control, including control of admission and departure times, based on the use of the portable electronic devices described above. According to this system, a card reader/writer is installed in a doorway, and the portable electronic devices are expected to be held over the card reader/writer.

In some portable electronic devices used in the conventional admission and departure control system described above, successive pieces of admission and departure information are stored into an IC. In this conventional admission and departure control system, however, admission or departure information is simply additionally recorded to the IC without reference to already written information at the time of admission or departure. In this case, there is a problem, for example, that past wrongful admission or departure using the portable electronic devices, if any, cannot be detected. There are some modern passports in which an IC chip and an antenna are embedded. If any immigration entry or exit information is simply additionally recorded to one such passport, for example, wrongful entry or exit may possibly be overlooked.

BRIEF SUMMARY OF THE INVENTION

An object of one embodiment of the invention is to provide a portable electronic device and a data control method capable of high-reliability control.

In order to attain the above object, in the embodiment of the invention, a portable electronic device is configured to perform processing in response to a command received from external equipment and comprises a storage section which stores various pieces of information, a transmitter/receiver section which transmits and receives data to and from the external equipment, a determination section which determines whether or not data paired with write data contained in a write command is stored by the storage section when the write command is received by the transmitter/receiver section, a writing section which writes the write data to the storage section if it is concluded by the determination section that the data paired with the write data contained in the write command is stored by the storage section, and an abnormality warning section which causes the transmitter/receiver section to transmit a result of determination on abnormality to the external equipment if it is concluded by the determination section that the data paired with the write data contained in the write command is not stored by the storage section.

According to an aspect of the invention, there may be provided a portable electronic device and a data control method capable of high-reliability control.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 6 is an explanatory diagram showing an example of personal information stored in a personal information storage section of the IC sheet of the IC book shown in FIG. 2;

FIG. 7 is an explanatory diagram showing an example of history information of entry/exit information stored in an entry/exit information storage section of the IC sheet of the IC book shown in FIG. 2;

DETAILED DESCRIPTION OF THE INVENTION

A portable electronic device and a data control method according to an embodiment of the present invention will be described in detail with reference to the accompanying drawings.

An IC book according to the embodiment of the invention will be described first.

Figure 1:
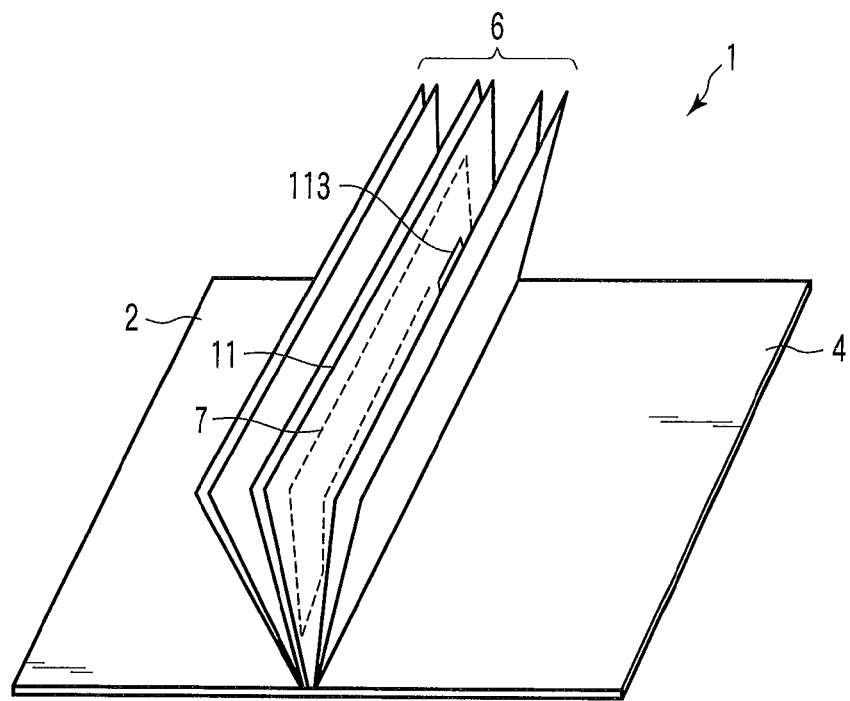
FIG. 1 is a perspective view showing a configuration example of an IC book according to one embodiment.

FIG. 1 is a perspective view for illustrating an outline of a configuration example of an IC book 1. The IC book is used for a personal authentication medium, such as a passport book, bankbook, company ID, or student ID.

The IC book 1 is formed by sandwiching rectangular inside pages 6 between two rectangular covers 2 and 4 (or one cover doubled in the manner shown in FIG. 1) and binding them on one side edge. As shown in FIG. 1, the inside pages 6 include an IC sheet 11, which is embedded with an IC module that is provided with an IC chip 113 and an antenna 7.

The IC sheet 11 is integrally formed in the following manner. First, a pattern of the antenna 7 of aluminum or the like is formed on a base material of a polyethylene resin, such as polyethylene terephthalate (PET). The IC chip 113 is mounted by the flip-chip method, and the obverse and reverse surfaces of the resulting substrate are held between noncrystalline polyester (PET-G) sheets or the like and subjected to vacuum hot pressing.

Although the IC sheet 11 is formed including the antenna 7 for wireless communication with external equipment, a contact terminal for contact communication may be disposed on a surface of the sheet 11.

The following is a description of a control system for the portable electronic device, the control system being composed of the electronic device and a terminal device.

Figure 2:
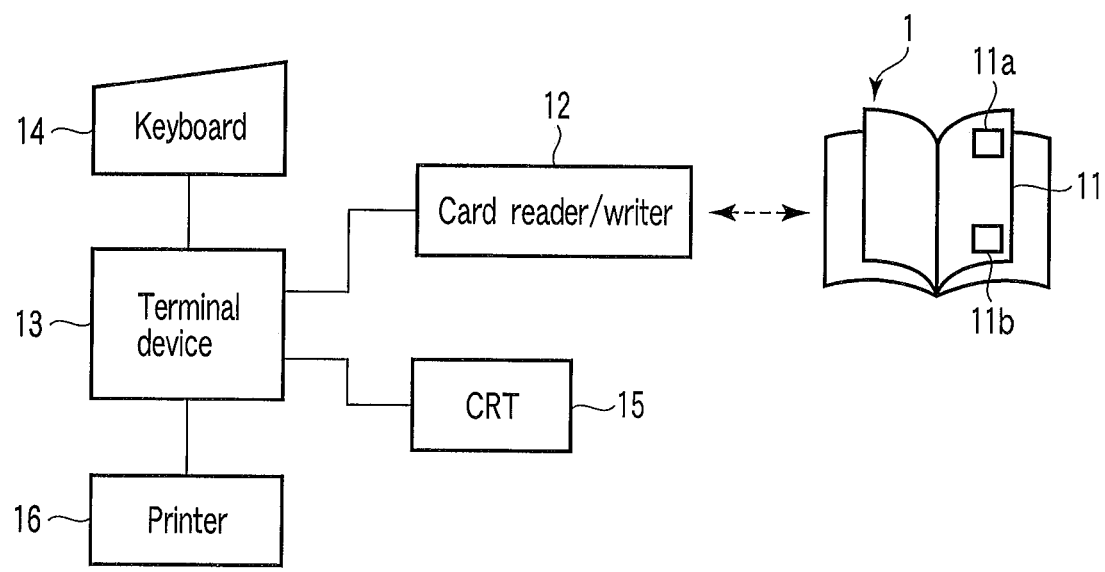
FIG. 2 is a block diagram showing a configuration example of the IC book and a terminal device according to the one embodiment.

FIG. 2 is a block diagram schematically showing a configuration example of the portable electronic device (IC book) 1 and a terminal device 13 according to the embodiment of the invention.

The terminal device 13 is connected to a card reader/writer 12, keyboard 14, CRT 15, printer 16, etc.

The terminal device 13 includes a CPU, various memories, various interfaces, etc. Further, the terminal device 13 has a function for data transmission and reception to and from the IC book 1 through the card reader/writer 12 and a function for various processes based on data received from the IC sheet 11 of the book 1.

For example, the terminal device 13 writes data to a nonvolatile memory in the IC chip 113 shown in FIG. 1 by transmitting a write command for the data to the IC book 1 through the card reader/writer 12. Further, the terminal device 13 reads data from the IC chip 113 by transmitting a read command to the IC book 1.

The card reader/writer 12 is an interface device for communication with the IC book 1. The reader/writer 12 is configured for power supply, clock supply, reset control, and data transmission and reception for the IC chip 113. Based on control by the terminal device 13, the card reader/writer 12 uses these functions to activate the IC chip 113, transmit various commands, receive responses to the transmitted commands, etc.

The keyboard 14 functions as an operation part that is operated by an operator of the terminal device 13. The operator can input various operating instructions and data by operating the keyboard 14. The CRT 15 is a display device that displays various pieces of information under the control of the terminal device 13. The printer 16 serves to print results of processing by the terminal device 13.

The following is a description of the IC sheet 11.

As shown in FIG. 1, the IC sheet 11 is a portable electronic device that is bound into the IC book 1, e.g., a passport book. The IC sheet 11 is configured to be activated (or enabled to operate) when it is supplied with electronic power from a host apparatus such as the terminal device 13. If the IC sheet 11 is connected to the terminal device 13 through contact communication, that is, if it has the contact terminal on its surface, for example, the sheet 11 is activated on receipt of operating power and clock supply from the terminal device 13 through the contact terminal as a communication interface.

If the IC sheet 11 is connected to the terminal device 13 through non-contact communication, that is, if it communicates with the terminal device 13 through the antenna 7, the sheet 11 receives radio waves from the terminal device 13 through the antenna 7, communication control section, etc., as communication interfaces. In response to these radio waves, the IC sheet 11 is activated, generating operating power and clocks through a power circuit.

The IC sheet 11 is provided with a storage area 11*a* (personal information storage section) in the nonvolatile memory in the IC chip 113. The personal information storage section 11*a* is stored with necessary information for a passport, including a photo-portrait, personal information, expiry date, passport country, etc. Further, the IC sheet 11 is provided with an area 11*b* (entry/exit information storage section) for the storage of an entry/exit record in the nonvolatile memory in the IC chip 113.

Figures 3, 4, 5:
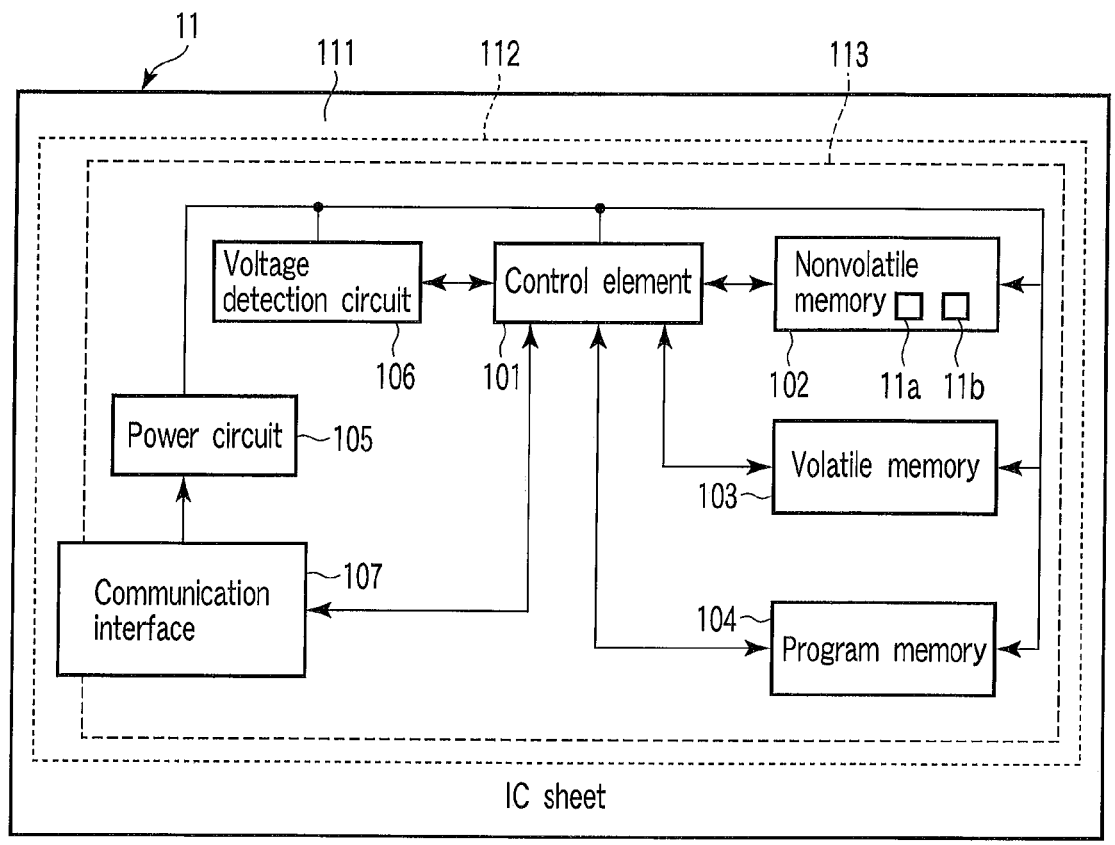
FIG. 3 is a block diagram showing a configuration example of the interior of an IC sheet of the IC book shown in FIG. 2.
FIG. 4 is an explanatory diagram showing a configuration example of exit information write commands transmitted from the terminal device shown in FIG. 2 to the IC sheet of the IC book.
FIG. 5 is an explanatory diagram showing a configuration example of an entry information write command transmitted from the terminal device shown in FIG. 2 to the IC sheet of the IC book.

FIG. 3 is a block diagram schematically showing a configuration example of the IC sheet 11 according to the first embodiment of the invention. The IC sheet 11 is configured so that a module 112 is incorporated in a housing that constitutes a main body 111. The module 112 is formed with one or more IC chips 113 connected to external interfaces for communication (communication interfaces) for one body. The module 112 is embedded in the main body 111 of the IC sheet 11. As shown in FIG. 3, moreover, the module 112 of the IC sheet 11 includes a control element 101, nonvolatile memory 102, volatile memory 103, program memory 104, power circuit 105, voltage detection circuit 106, and communication interface 107.

The control element 101 serves to control the IC sheet 11 as a whole. It performs various processes by operating based on control programs and control data stored in the program memory 104 or the nonvolatile memory 102.

The nonvolatile memory 102 is composed of a writable/rewritable nonvolatile memory, such as an EEPROM or flash ROM. The memory 102 functions as a storage section. The control programs and various data are written to the memory 102, depending on the usage of the IC sheet 11. Program files, data files, etc., are defined in the nonvolatile memory 102, for example, and the control programs and the various data are written to those files. Further, the nonvolatile memory 102 is provided with the personal information storage section 11*a* and the entry/exit information storage section 11*b* mentioned before.

The volatile memory 103 functions as a working memory. The volatile memory 103 also serves as a buffer that temporarily stores data being processed by the control element 101. For example, the volatile memory 103 is configured to temporarily store data received from the terminal device 13 through the communication interface 107.

The program memory 104 is a nonvolatile memory that is previously stored with control programs, control data, etc.

The program memory 104 is incorporated into the IC sheet 11 in such a manner that it is stored with the control programs and data in the stage of manufacture. In other words, the control programs and data stored in the program memory 104 are previously incorporated into the IC book 1 according to its specifications.

Further, the program memory 104 is stored with a passport book application for various processes associated with entry/exit information. The control element 101 can determine whether or not right entry/exit information is stored by executing the passport book application.

In the case where the IC sheet 11 performs non-contact communication, the power circuit 105 generates operating power and clocks from radio waves received from the card reader/writer 12 shown in FIG. 2, and supplies them to each in the module 112. The voltage detection circuit 106 monitors a voltage supplied to the control element 101. The voltage detection circuit 106 functions as a reset circuit for the control element 101.

The communication interface 107 is a transmitter/receiver section, which communicates with the card reader/writer 12 shown in FIG. 2. If the IC sheet 11 is realized as a contact-type IC sheet, the communication interface 107 is composed of a communication control section, which contacts the card reader/writer 12 to perform signal transmission and reception, and a contact section for use as an external interface. If the IC sheet 11 is realized as a non-contact IC sheet, on the other hand, the communication interface 107 is composed of a communication control section for wireless communication with the card reader/writer 12 and an antenna as an external interface.

FIG. 4 is an explanatory diagram showing a format example of exit information write commands transmitted from the terminal device 13 shown in FIG. 2 to the IC sheet 11 of the IC book 1.

The exit information write commands include "CLA", "INS", "P1", "P2", "Lc", and "Data". "CLA" is an instruction class, which is one-byte data for designating the type of a processing command. "INS" is an instruction code, which is one-byte data for ordering an operation. In this example, "INS" is given by "XX" that is indicative of an operation for writing exit information.

"P1" and "P2" are instruction parameters, each of which is one-byte data indicative of a set value used in executing an operation. "Lc" is three-byte data indicative of the length of a "Data" portion. "Data" is used for an operation based on the command concerned. In this example, "Data" contains the date, time, and country code for a country in which the terminal device 13 is installed.

FIG. 5 is an explanatory diagram showing a format example of entry information write commands transmitted from the terminal device 13 shown in FIG. 2 to the IC sheet 11 of the IC book 1. A description of the same items as those shown in FIG. 3 will be omitted.

The entry information write command "INS" is given by "YY" that is indicative of an operation for writing entry information.

Specifically, the IC sheet 11 shown in FIG. 1 refers to the received command "INS" and concludes that an exit information write command is received if "XX" is found and that an entry information write command is received if "YY" is found.

FIG. 6 is an explanatory diagram showing an example of information stored in the personal information storage section 11a shown in FIG. 2.

The personal information storage section 11a is stored with the expiry date of the IC book 1 as a passport, the issuing country code of the country in which the book 1 is issued, the passport number or identification number of the book 1, and the name, date of birth, and sex of a person to whom the IC book 1 is issued.

FIG. 7 is an explanatory diagram showing an example of information stored in the entry/exit information storage section 11b shown in FIG. 2.

The entry/exit information storage section 11b is stored, as entry/exit records, the date and time of entry or exit, the type of immigration, entry or exit, and the country code of the entered or exited country, corresponding to a record number indicative of the order of recording.

The following is a description of the operation of the control system described above.

Figure 8:
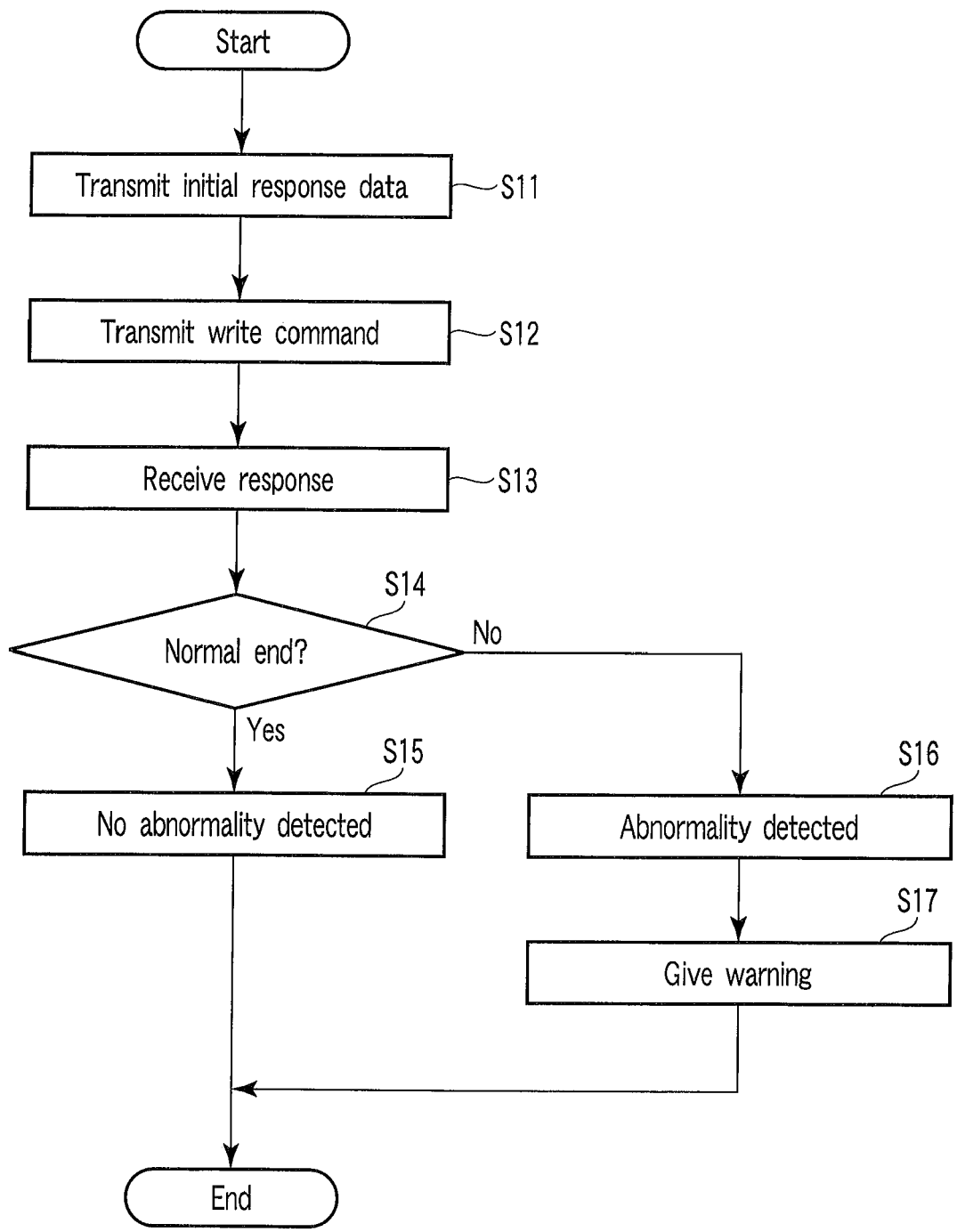
FIG. 8 is a flowchart for illustrating processes in the terminal device shown in FIG. 2.

FIG. 8 is a flowchart for illustrating processes in the terminal device 13 shown in FIG. 2.

When the IC sheet 11 of the IC book 1 is detected by the card reader/writer 12, the terminal device 13 transmits initial response data to the sheet 11 (Step S11). Thereupon, the terminal device 13 recognizes the IC sheet 11. If the IC sheet 11 is a non-contact IC sheet, the terminal device 13 performs anti-collision processing, thereby securing communication with the sheet 11.

The terminal device 13 transmits a write command to the IC sheet 11 (Step S12). In the case of exit processing, the terminal device 13 transmits the exit information write command shown in FIG. 3 to the IC sheet 11. In the case of entry processing, the terminal device 13 transmits the entry information write command shown in FIG. 4 to the sheet 11.

When the command is transmitted, the terminal device 13 receives a response from the IC sheet 11 corresponding to the transmitted command (Step S13). This response contains OK/NG information that indicates whether or not processing is normally completed in the IC sheet 11.

Based on the received response, the terminal device 13 determines whether or not processing is normally completed in the IC sheet 11 (Step S14). Thus, if a response OK is received from the IC sheet 11, the terminal device 13 concludes that there is no abnormality (Step S15) and terminates the processing. If a response NG is received from the IC sheet 11, on the other hand, the terminal device 13 concludes that there is an abnormality (Step S16) and warns its operator of the abnormality (Step S17).

Figure 9:
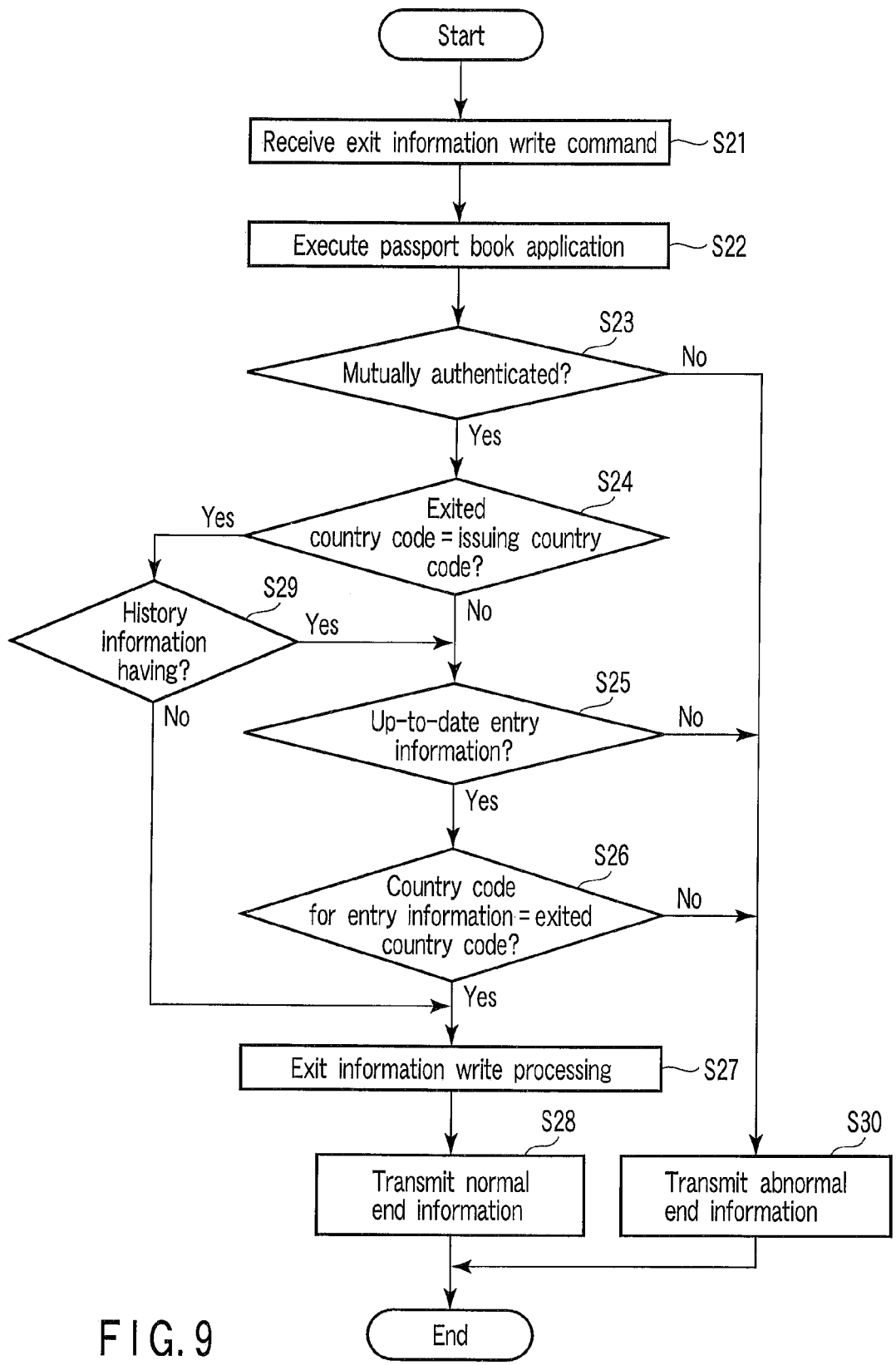
FIG. 9 is a flowchart for illustrating processes performed when an exit information write command in the IC sheet of the IC book shown in FIG. 2 is received.

FIG. 9 is a flowchart for illustrating processes performed when an exit information write command in the IC sheet 11 of the IC book 1 shown in FIG. 1 is received.

If it is concluded that the exit information write command is received (Step S21), the control element 101 of the IC sheet 11 reads a passport book program from the program memory 104 and executes it (Step S22). The control element 101 makes various decisions based on memory contents stored in the nonvolatile memory 102. The control element 101 functions as a determination section.

First, the control element 101 determines whether or not mutual authentication with the terminal device 13 is established (Step S23). If it is concluded that the mutual authentication is established (YES in Step S23), the control element 101 determines whether or not the country code of the exited country contained in the exit information write command is coincident with the country code of the IC sheet issuing country stored in the personal information storage section 11a (Step S24).

If it is concluded that the country code of the exited country contained in the exit information write command is not coincident with the country code of the IC sheet issuing country stored in the personal information storage section 11a (NO in Step S24), the control element 101 refers to up-to-date information of the entry/exit information storage section 11*b*, that is, information indicative of the type of immigration, entry or exit, corresponding to the largest record number, and determines whether or not the information is entry information (Step S25).

If it is concluded that the up-to-date information stored in the entry/exit information storage section 11*b* is entry information (YES in Step S25), the control element 101 determines whether or not the country code of the exited country contained in the exit information write command is coincident with the country code for up-to-date entry information stored in the entry/exit information storage section 11*b* (Step S26).

If it is concluded that the country code of the exited country contained in the exit information write command is coincident with the country code for the up-to-date entry information stored in the entry/exit information storage section 11*b* (YES in Step S26), the control element 101 attaches the up-to-date record number to the date, time, country code, and exit information contained in the exit information write command and writes them to the entry/exit information storage section 11*b* (Step S27). Thus, in this case, the control element 101 of the IC sheet 11 functions as a writing section.

Then, the IC sheet 11 transmits OK or normal end information, as a response to the exit information write command, to the terminal device 13 (Step S28), whereupon the processing is terminated.

If it is concluded in Step S24 that the country code of the exited country contained in the exit information write command is coincident with the country code of the IC sheet issuing country stored in the personal information storage section 11*a* (YES in Step S24), the control element 101 determines whether or not history information is stored in the entry/exit information storage section 11*b* (Step S29). In other words, the control element 101 determines whether or not the IC book 1 is a mint one. If the information is already stored in the entry/exit information storage section 11*b* (YES in Step S29), the control element 101 goes to Step S25. If no information is stored in the storage section 11*b* (NO in Step S29), the control element 101 goes to Step S27, in which it performs exit information write processing.

If it is concluded in Step S23 that the mutual authentication with the terminal device 13 is not established (NO in Step S23), if it is concluded in Step S25 that the up-to-date information stored in the entry/exit information storage section 11*b* is not entry information (NO in Step S25), or if it is concluded in Step S26 that the country code of the exited country contained in the exit information write command is not coincident with the country code for the up-to-date entry information stored in the entry/exit information storage section 11*b* (NO in Step S26), the IC sheet 11 transmits NG or abnormal end information, as a response to the exit information write command, to the terminal device 13 (Step S30), whereupon the processing is terminated. Thus, in this case, the control element 101 of the IC sheet 11 functions as an abnormality warning section.

Figure 10:
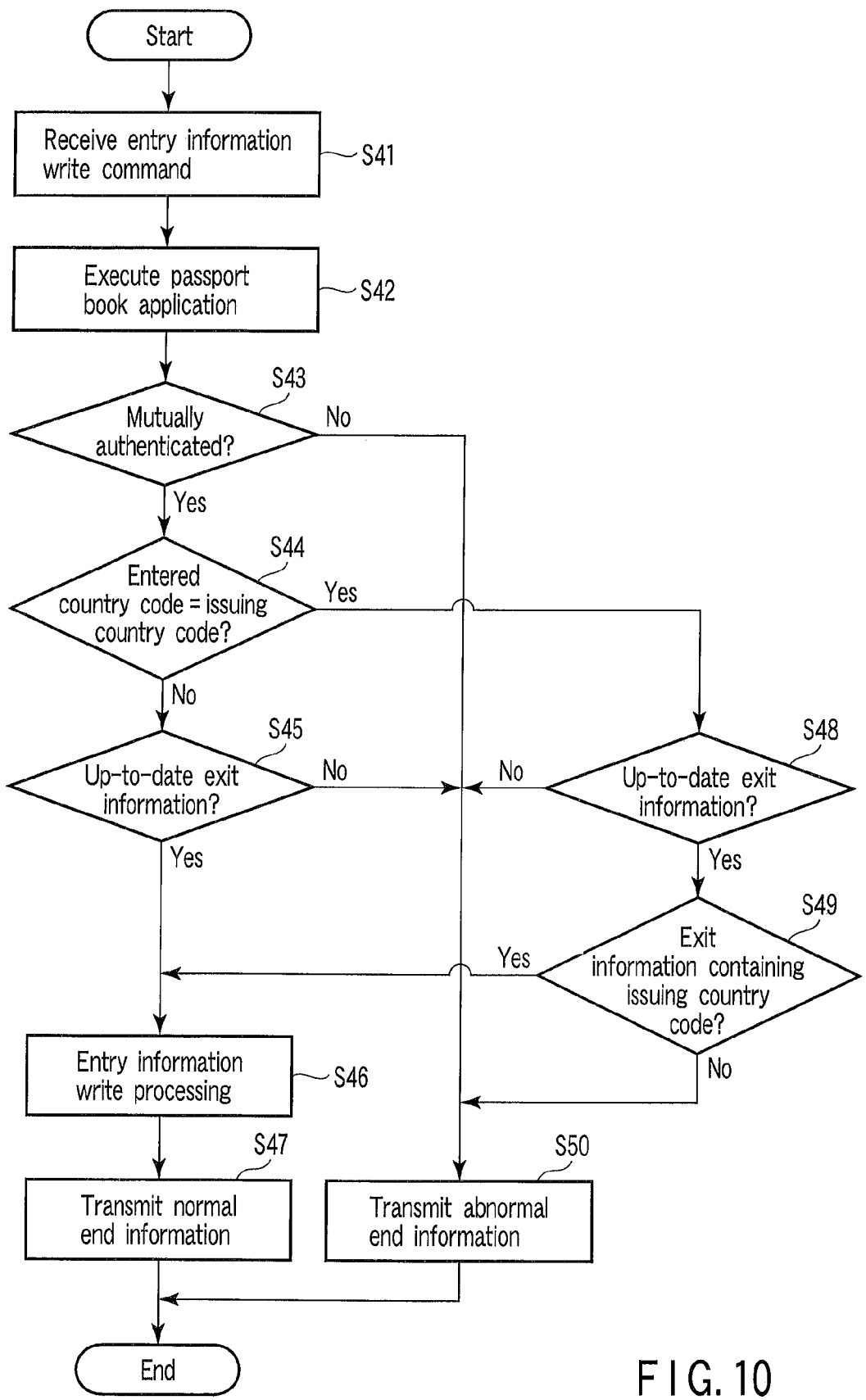
FIG. 10 is a flowchart for illustrating processes performed when an entry information write command in the IC sheet of the IC book shown in FIG. 2 is received.

FIG. 10 is a flowchart for illustrating processes performed when an entry information write command in the IC sheet 11 of the IC book 1 shown in FIG. 1 is received.

If it is concluded that the entry information write command is received (Step S41), the control element 101 of the IC sheet 11 reads the passport book program from the program memory 104 and executes it (Step S42).

The control element 101 determines whether or not mutual authentication with the terminal device 13 is established (Step S43). If it is concluded that the mutual authentication is established (YES in Step S43), the control element 101 determines whether or not the country code of the entered country contained in the entry information write command is coincident with the country code of the IC sheet issuing country stored in the personal information storage section 11*a* (Step S44).

If it is concluded that the country code of the entered country contained in the entry information write command is not coincident with the country code of the IC sheet issuing country stored in the personal information storage section 11*a* (NO in Step S44), the control element 101 refers to up-to-date information of the entry/exit information storage section 11*b*, that is, information indicative of the type of immigration, entry or exit, corresponding to the largest record number, and determines whether or not the information is exit information (Step S45).

If it is concluded that the up-to-date information stored in the entry/exit information storage section 11*b* is exit information (YES in Step S45), the control element 101 attaches the up-to-date record number to the date, time, country code, and entry information contained in the entry information write command and writes them to the entry/exit information storage section 11*b* (Step S46). Then, the IC sheet 11 transmits OK or normal end information, as a response to the entry information write command, to the terminal device 13 (Step S47), whereupon the processing is terminated.

If it is concluded in Step S45 that the country code of the entered country contained in the entry information write command is coincident with the country code of the IC sheet issuing country stored in the personal information storage section 11*a* (YES in Step S44), the control element 101 refers to up-to-date information of the entry/exit information storage section 11*b*, that is, information indicative of the type of immigration, entry or exit, corresponding to the largest record number, and determines whether or not the information is exit information (Step S48).

If it is concluded that the up-to-date information of the entry/exit information storage section 11*b* is exit information (YES in Step S48), the control element 101 determines whether or not the exit information that contains the country code of the IC sheet issuing country stored in the personal information storage section 11*a* is stored in the entry/exit information storage section 11*b* (Step S49). If it is concluded that the exit information that contains the country code of the IC sheet issuing country stored in the personal information storage section 11*a* is stored in the entry/exit information storage section 11*b* (YES in Step S49), the control element 101 goes to Step S46, in which it performs entry information write processing.

If it is concluded in Step S43 that the mutual authentication with the terminal device 13 is not established (NO in Step S43), if it is concluded in Steps S45 and S48 that the up-to-date information stored in the entry/exit information storage section 11*b* is not exit information (NO in Steps S45 and S48), or if it is concluded in Step S49 that the exit information that contains the country code of the IC sheet issuing country stored in the personal information storage section 11*a* is not stored in the entry/exit information storage section 11*b* (NO in Step S49), the IC sheet 11 transmits NG or abnormal end information, as a response to the entry information write command, to the terminal device 13 (Step S50), whereupon the processing is terminated.

If the exit information write command is received, as described above, the IC sheet 11 of the IC book 1 refers to the up-to-date information stored in the entry/exit information storage section 11*b*. If the information is entry information for the exited country, exit information is stored into the entry/exit information storage section 11*b*, and normal end information is transmitted to the terminal device 13. If the entry information write command is received, the IC sheet 11 refers to the up-to-date information stored in the entry/exit information storage section 11b. If the information is exit information, entry information is stored into the entry/exit information storage section 11b, and normal end information is transmitted to the terminal device 13. Thus, the IC sheet 11 checks the processing for normality by determining whether or not the stored information is paired with information to be written.

According to this arrangement, the IC book continually refers to past records of entry/exit information and determines whether or not the last written entry/exit information is right. Thus, writing of wrong entry/exit information can be detected. In consequence, there may be provided a portable electronic device and a data control method capable of higher-reliability control.

This invention is not limited directly to the embodiment described above, and its components may be embodied in modified forms without departing from the scope or spirit of the invention. Further, various inventions may be formed by suitably combining a plurality of components described in connection with the foregoing embodiment. For example, some of the components according to the foregoing embodiment may be omitted. Furthermore, components according to different embodiments may be combined as required.

In the present embodiment, for example, the IC sheet is expected to refer to the up-to-date information stored in the entry/exit information storage section 11b and determine whether or not the stored information is paired with the information to be written. Alternatively, however, the IC sheet may be configured to refer to past records of entry/exit information stored in the entry/exit information storage section 11b and determine whether or not there exists any non-corresponding information. Alternatively, moreover, the IC sheet may be configured to ascertain that the oldest one of the past records of entry/exit information stored in the entry/exit information storage section 11b is exit information.

In the case where the IC sheet is used for a passport or the like, the entry/exit information must be handled more strictly. According to the IC sheet of the embodiment described above, however, the entry/exit information can be checked for authenticity with reference to the history information. Thus, there may be provided a portable electronic device and a data control method capable of higher-reliability control.

According to the present embodiment, the portable electronic device has been described as a passport book in which the IC sheet is bound. However, the portable electronic device is not limited to this, and this invention may also be applied to any other suitable device that is provided with an IC chip and a transmitter/receiver section that transmits and receives data to and from external equipment. The alternative device may, for example, be an IC tag, bankbook, credit card, cash card, passbook, ID card, cell phone, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable electronic device comprising:
   a first storage section configured to store immigration information in order, the immigration information including a country code and information indicative of entry or exit;
   a receiver configured to receive a command transmitted from external equipment;
   a first writing section configured to write a country code corresponding to a write command of exit information and information indicative of exit in the first storage section, provided that the write command of exit information including the country code is received by the receiver, a country code included in latest immigration information of the immigration information stored in the first storage section agrees with the country code included in the write command of exit information, and the latest immigration information is entry information including information indicative of entry; and
   a second writing section configured to write a country code corresponding to a write command of entry information and information indicative of entry in the first storage section, provided that the write command of entry information including the country code is received by the receiver, and the latest immigration information is exit information including the information indicative of exit.

2. The portable electronic device of claim 1, further comprising:
   a second storage section configured to store a country code indicative of an issuing country,
   wherein the first writing section is further configured to write a country code corresponding to the write command of exit information, provided that the write command of exit information including the country code is received by the receiver, a country code stored in the second storage section agrees with the country code included in the write command of exit information, and the immigration information is not stored in the first storage section.

3. The portable electronic device of claim 1, further comprising:
   a second storage section configured to store a country code indicative of an issuing country,
   wherein the second writing section is further configured to write a country code corresponding to the write command of entry information, provided that the write command of entry information including the country code is received by the receiver, a country code stored in the second storage section agrees with the country code included in the write command of entry information, and a country code that agrees with the country code included in the write command of entry information and the immigration information indicative of exit are stored in the first storage section.

4. The portable device of claim 1, further comprising:
   an abnormality warning section configured to issue a warning to the external equipment, provided that the write command of exit information is received and the country code included in the latest immigration information does not agree with the country code included in the write command of exit information, or provided that the latest immigration information is not the entry information.

5. The portable device of claim 1, further comprising:
   an abnormality warning section configured to issue a warning to the external equipment, provided that the write command of entry information is received and the latest immigration information is not the exit information, 6. A. control method used in a portable electronic device comprising a storage section configured to store information and a receiver section configured to receive a command transmitted from external equipment, the method comprising:

storing immigration information in order, the immigration information including a country code and information indicative of entry or exit;

writing a country code corresponding to a write command of exit information and information indicative of exit in the storage section, provided that the write command of exit information including the country code is received by the receiver section, a country code included in latest immigration information of the immigration information stored in the storage section agrees with the country code included in the write command of exit information, and the latest immigration information is entry information including information indicative of entry; and writing a country code corresponding to a write command of entry information and information indicative of entry in the storage section, provided that the write command of entry information including the country code is received by the receiver section, and the latest immigration information is exit information including information indicative of exit.

* * * * *